Dec. 8, 1959        J. R. PARKER        2,915,831
APPARATUS FOR DESIGNING INDUSTRIAL PLANT LAYOUT
Filed Feb. 18, 1955        3 Sheets-Sheet 1
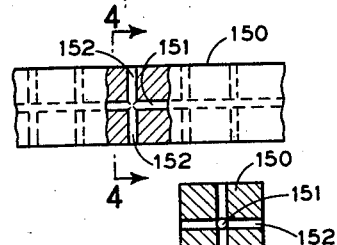
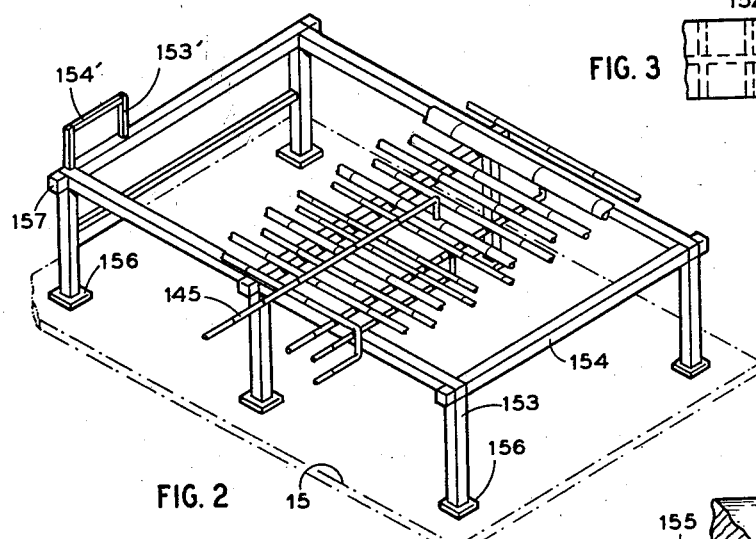
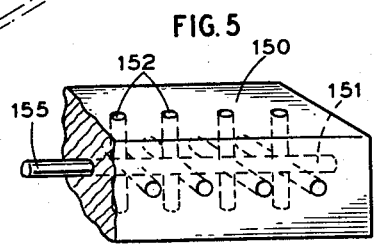
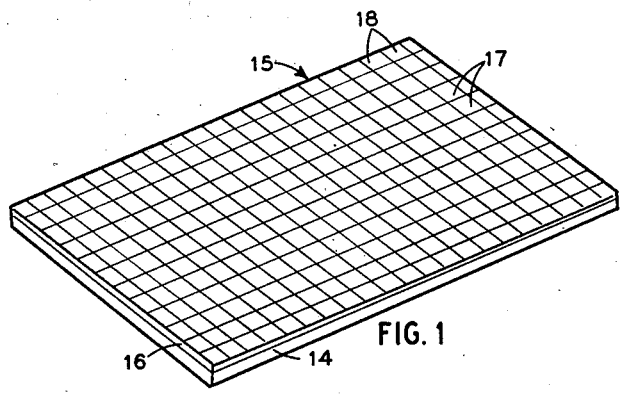
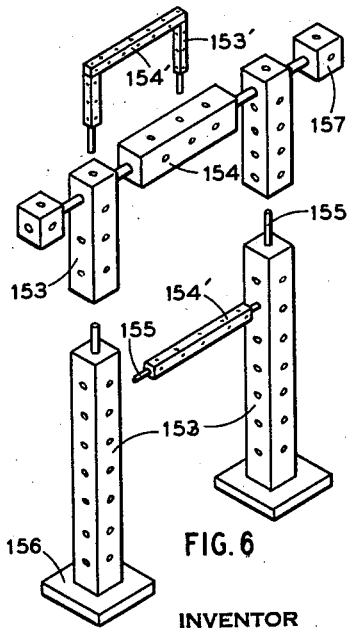
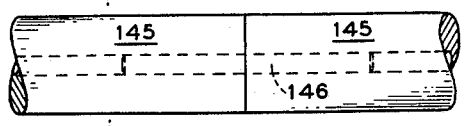
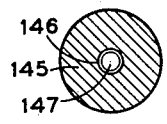
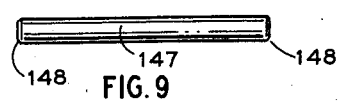
INVENTOR
JACK R. PARKER
BY
*Irving Seidman*
ATTORNEY Dec. 8, 1959            J. R. PARKER            2,915,831
APPARATUS FOR DESIGNING INDUSTRIAL PLANT LAYOUT
Filed Feb. 18, 1955                          3 Sheets-Sheet 2
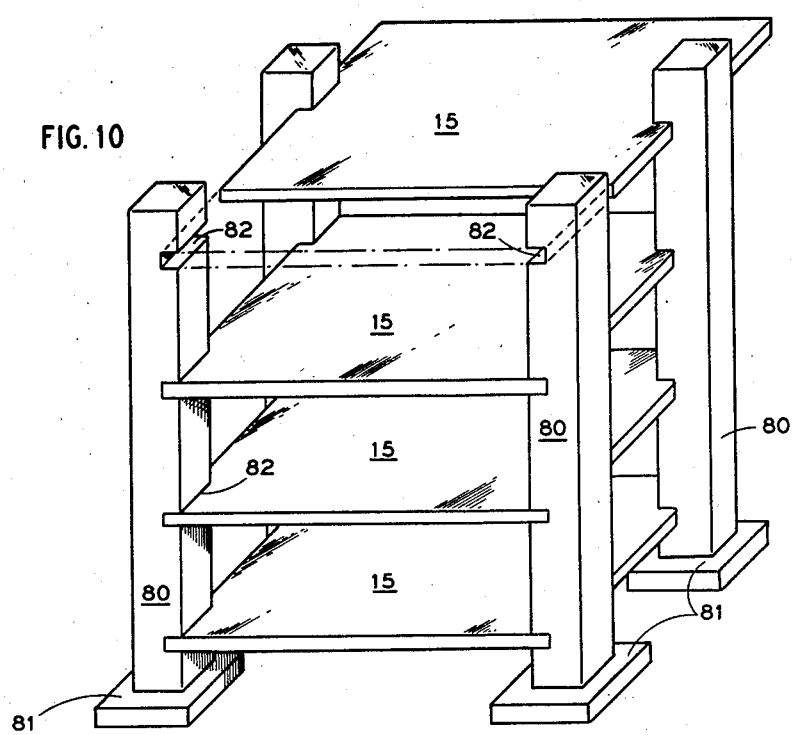
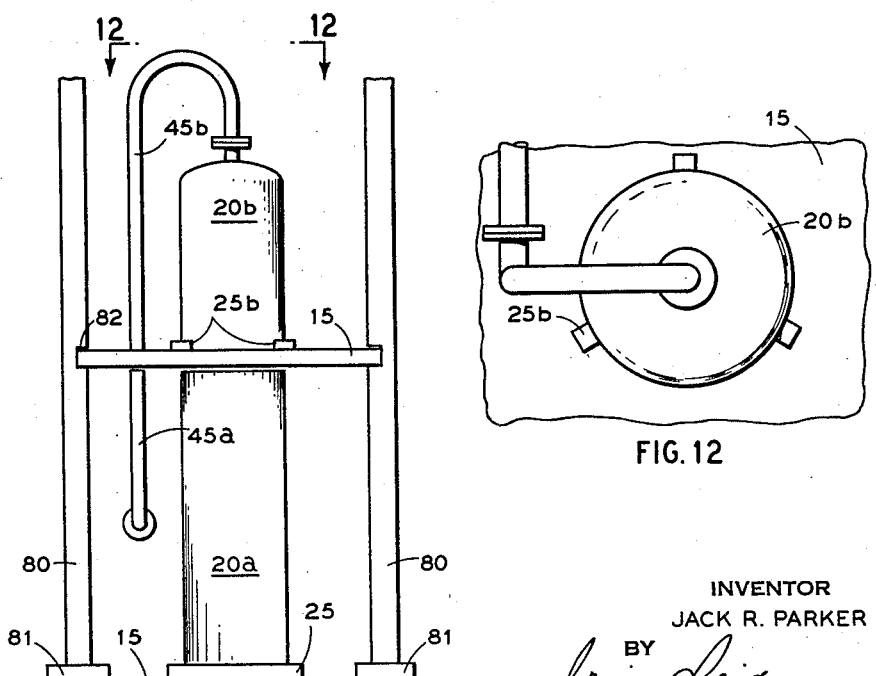
INVENTOR
JACK R. PARKER
BY
*Irving Seidman*
ATTORNEY Dec. 8, 1959 J. R. PARKER 2,915,831
APPARATUS FOR DESIGNING INDUSTRIAL PLANT LAYOUT
Filed Feb. 18, 1955 3 Sheets-Sheet 3
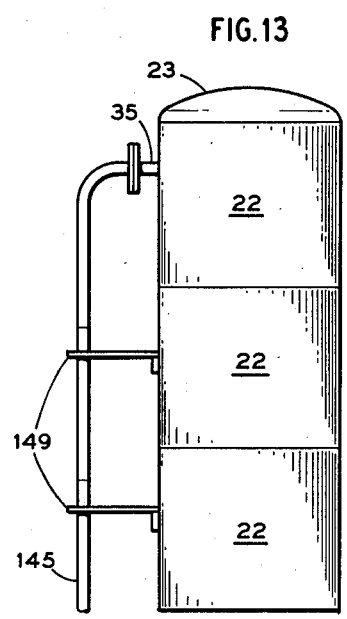
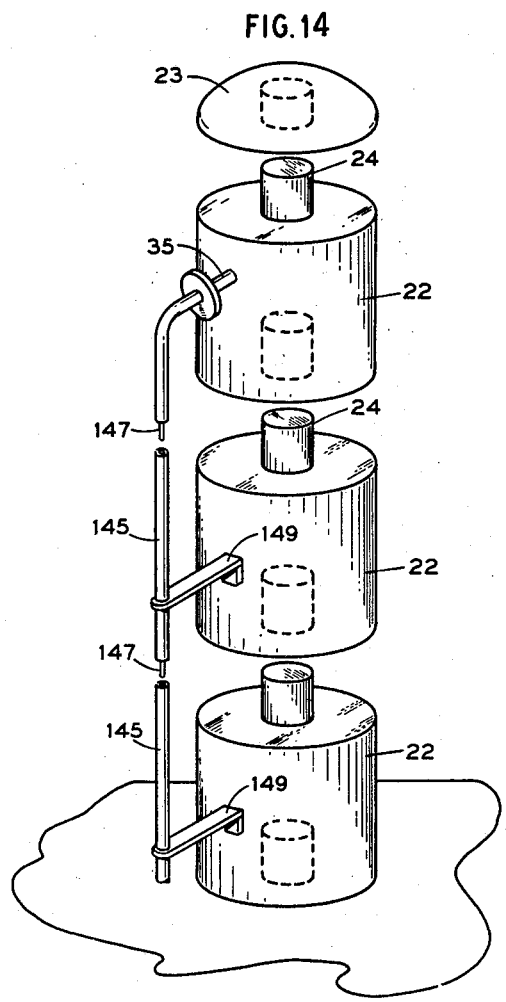
INVENTOR.
JACK R. PARKER
BY
ATTORNEY United States Patent Office 2,915,831
Patented Dec. 8, 1959

2,915,831

APPARATUS FOR DESIGNING INDUSTRIAL PLANT LAYOUT

Jack R. Parker, Malverne, N.Y.

Application February 18, 1955, Serial No. 489,133

5 Claims. (Cl. 35—16)

This invention relates to a method of and apparatus for designing an industrial plant layout. More particularly, the invention is directed to novel means for constructing a three-dimensional model of such a layout, in which the size and relation of parts can be readily and easily changed at will, and to a method of providing two-dimensional reproductions of such model for use as dimensioned construction plans. The present application is a continuation-in-part of my copending application Serial No. 468,340, filed November 12, 1954, now Patent No. 2,738,584.

The customary way of planning and designing an industrial plant layout, such as a chemical plant or a refinery, for example, is to draw scale plans, elevations and sections of each floor on paper. The various items of equipment and their connections, such as fluid lines, piping, wiring, etc. were sketched in tentatively, and then erased or re-drawn as often as necessary to work out their ultimate locations with required clearances and working spaces.

While this procedure is laborious, costly, and time consuming in general, it is particularly so in designing refineries, chemical plants and like apparatus due to the necessity for proper location and orientation of manholes, handholes, valves, etc., for access from working stations.

An improvement on this procedure has been the preparation of scale plans of the various levels or floors and the use of scale plan cutouts or three-dimensional models of the several equipment units. These models are moved around the scale plan drawings until the desired locations and orientations are achieved. The units must then be sketched onto the plan drawings and their connections drawn in. While this has saved some time, it is still costly as accurate scale models of each piece of equipment must be provided for each new layout.

It has also been proposed to photograph such three-dimensional layouts to provide working prints thereof. However, numerous difficulties and complications in successfully applying this latter technique have rendered it impractical for commercial use.

The subject matter of my above-mentioned copending application relates to a novel means and method for preparing three-dimensional scale layouts of industrial plants and effectively using these layouts to prepare the actual working or erection prints. The means thereof includes a magnetizable metal plate which is scribed with perpendicularly related longitudinal and lateral lines forming a grid of squares corresponding to the scale of the three-dimensional model. Each of the units or items of equipment to be mounted on the plate has a magnetized base or foundation so that, when positioned on the plate, it will remain in place.

Each vessel or tank is made up of interengageable sections including heads and intermediate filler pieces. The filler pieces are supplied in uniform scale lengths for each diameter of vessel so that, by using the filler pieces, the vessel may be built up to any desired length in increments of one foot, and the dished heads added. The same vessel elements can be used for either vertically or horizontally arranged vessels. The filler pieces are of a soft material, such as a soft wood, so that attachments may be readily secured to the vessel by pressing prints or nails into the wood.

Prefabricated manholes, handholes, valves, and nozzles are supplied in scale for all standard sizes, and provided with sharp points for mounting on the vessel. The outer ends of the nozzles are recessed to receive piping.

With the handholes, manholes, valves and nozzles properly positioned on each vessel, the working platforms can be installed on each vessel at the proper location for working the valves and for access to the handholes and manholes. These platforms are pre-cut to scale in the several contours (round, half-round, square, etc.) required. To install the platforms, several nails are pushed into the vessels at the desired platform location. A magnetized strip on the undersurface of the platform engages the nails to hold the platform in position. The platforms can thus be readily relocated as desired.

The piping used is plastic extrusions, either solid or tubular, in all scale diameters including covering insulation. Connections, such as T's, bends, elbows, loops, etc., are cast or prefabricated from such tubing, and joints are formed by tubular collars receiving the ends of the piping or its connections. The plastic "pipe" can be easily cut or sawed to appropriate lengths, and can be appropriately colored for identification. The scale valves may be of metal or plastic and arranged for "snap-on" connection to the piping at any desired location.

Structural shapes and members are prefabricated to scale of metal or plastic, and joined by dowelled connection pieces to form supports for overhead piping. These shapes and members are provided with magnetized bases for ready adherence to the scaled foundation plate. The foundation pieces for the structural members, as well as the saddles and supports for the vessels, are formed with a projecting lip for clamping to the scaled metal plate for shipment of the model to the field.

The present invention is directed to improved forms of structural members and apparatus components used in constructing the model and to improved components supporting arrangements facilitating the removal of complete levels of the model to expose to view underlying levels.

The structural members are cut to size from long bars of plastic, wood or metal, these bars being furnished in assorted lengths and thicknesses. The bars have a round hole extending longitudinally and centrally therethrough and intersected by longitudinally spaced transverse holes extending from each side of the bar at right angles to the central hole. The uprights have magnets fastened to their lower ends, after being cut to the required size. These magnets secure the uprights or vertical supports to the metal base plate. The cross members and vertical extensions are secured to the uprights by short dowels engaged in the appropriate holes.

The piping is tubular plastic, metal, or wood furnished in various lengths, with the central passage being the same diameter in all sizes. The "piping" is cut to proper length and connected by short dowels inserted in the central passages of abutting lengths.

The components at various levels of the model are supported on magnetizable metal base plates which, in turn, are supported by sliding the plates into slots in the sides of uprights of a superstructure. Thus, each level can be removed intact to expose an underlying level. To facilitate such removal, components, such as pressure vessels, extending through several levels, are made in sections with each section having magnets on its lower end to hold the section in place on its supporting base plate. Similarly, piping is provided in sections each terminating at a base plate and aligned with the mating section in the adjacent level.

For an understanding of the invention principles, reference is made to the following description of a typical embodiment thereof as illustrated in the accompanying drawing.

In the drawing:

Fig. 1 is a perspective view of the grid inscribed mounting plate;

Fig. 2 is a perspective view of a three-dimensional scale model of a supporting structure for overhead piping;

Fig. 3 is a side elevation view, partly in section, of a structural member;

Fig. 4 is a transverse sectional view on the line 4—4 of Fig. 3;

Fig. 5 is a partial perspective view of a structural member with a connection dowel projecting therefrom;

Fig. 6 is an exploded perspective view of a portion of Fig. 2;

Fig. 7 is a side elevation view of a piping joint;

Fig. 8 is a transverse sectional view on the line 8—8 of Fig. 7;

Fig. 9 is a side elevation view of a connection dowel;

Fig. 10 is a perspective view illustrating the super-structure for supporting different levels;

Fig. 11 is an elevation view of a plural level model;

Fig. 12 is a plan view on line 12—12 of Fig. 11;

Fig. 13 is an elevation view illustrating a vessel and associated piping arranged for sectional disassembly; and Fig. 14 is an exploded perspective view corresponding to Fig. 13.

Referring to Fig. 1, the mounting plate 15 comprises a flat base 14 of plywood or the like, to the upper surface of which is secured a sheet of metal 16. Metal sheet 16 has inscribed thereon a regular grid to the desired scale of the three-dimensional model. This grid comprises uniformly spaced and parallel longitudinal lines 17 and lateral lines 18 intersecting at right angles.

Mounting plate 15 forms the support for the model, and for this purpose, all the elements directly engaging the plate 15 are formed with magnetized bases so that, when placed on plate 15 they will remain in position. The grid 17—18 provides for accurate relative positioning of the various units at proper horizontal spacing and, in addition, provides a scale useful in the ultimate working prints.

Referring to Figs. 2 through 6, the structural members 150 are used, for example, to form a support for overhead piping in yards, etc., such support involving uprights 153, 153', horizontal members 154, 154', and extensions 157, the uprights having magnetic bases 156 for mounting the framework on plates 15. Each structural member is cut to size from appropriate length bars of metal, plastic, or wood. These bars are formed with longitudinally central holes or passages 151 therethrough and with transverse holes or passages 152 extending from each surface perpendicularly through longitudinal hole 151. Transverse holes 152 are spaced at regular modular intervals along the bars 150 and, at each location, the transverse holes from all four sides intersect each other at hole 151. The bars 150 may be provided in several different thicknesses and sections.

To assemble the framework after bars 150 have been cut to the right lengths for components 153, 153', 154, 154', and 157, dowels 155 are inserted into the appropriate holes 151, 152 in joining components, these holes all being of the same diameter irrespective of the size of bars 150. The piping 145 is then mounted on the framework.

This piping is formed of tubular rods of wood, plastic, or metal in appropriate lengths and of different diameters. However, irrespective of the piping O.D. the I.D., representing the diameter of axial passage 146, is always the same. Thus, the lengths of tubing may be cut to correct length and the sections interconnected by dowels 147 engaged in passages 146 of adjoining sections. These dowels are preferably formed with bevelled ends 148 to facilitate assembly, and the dowels 155 may also have such bevelled ends.

Many industrial plant layouts involve several working levels or floors. The arrangement of Figs. 10, 11 and 12 provides for removal of overlying levels or floors, with their supported components, to allow access to underlying levels or floors for inspection or photographing. In this arrangement, a "superstructure" of uprights 80 is provided, with each upright having a magnet base 81 on its lower end for mounting on a ground level plate 15. At regularly vertically spaced intervals, corresponding to the distance between the floors or working levels, uprights 80 are formed witht transverse horizontal slots 82 in one or more sides. These slots slidably receive the plates 15 supporting the apparatus components at the different levels. By withdrawing an upper level plate 15, with its supported components, from slots 82, a lower level plate 15 and its supported components is exposed.

In the case of components extending through several levels, the component is made in sections each supported on a plate 15 at one level. Thus, a pressure vessel 25 extending through two levels, for example, is formed as a lower section 20a secured on foundation plate 15 by magnet base 25, and an upper section 20b having magnets 25b securing it to upper plate 15, each section terminating a short distance beneath the support base of the next level above. Piping 45 associated with vessel 20 is cut into sections 45a and 45b. These sections are glued or cemented to the support plate 15 and terminate a short distance beneath the next support base above, for an easy "break" when this level is slid out of slots 82.

While a specific embodiment of the invention has been shown and described in detail to illustrate the application of the invention principles, it will be understood that the invention may be embodied otherwise without departing from such principles.

What is claimed is:

1. For use in constructing a three-dimensional model of an industrial plant including scale model piping, elongated pieces of relatively rigid small diameter tubing of differing outside diameters and having the same inside diameter; and a plurality of dowels arranged to seat tightly in said tubing; whereby said tubing may be cut to scale length to form piping sections and assembled in end-to-end abutment to other similar piping sections by said dowels to form a scale model piping layout, the dowels being concealed to provide the illusion of continuous piping.

2. A three-dimensional scale model of a multi-level industrial plant comprising, in combination, a plurality of magnetizable metal support plates; a plurality of scale model structural columns each having a supporting base of magnetized metal for adherence to one of said plates used as a foundation plate; each of said columns having transverse slots therein at equal vertical distance therealong whereby others of said support plates may be mounted on said columns at the several levels by sliding the support plates into facing slots; and scaled units each having a base of magnetized metal adhering to a support plate; whereby an upper level may be removed to expose a lower level by sliding the upper level support plate out of its respective slots with its scaled units remaining adhered thereto.

3. A model as claimed in claim 2 wherein units extending into more than one level are formed in sections each having magnetized metal bases adhering to a support plate.

4. A model as claimed in claim 3 including scale model piping extending into more than one level and formed as sections in each level aligned with continued sections in another level, the ends of the sections being adhered to a support plate.

5. For use in constructing a three-dimensional scale model of an industrial plant, a three-dimension scale vessel comprising axially disengageable cylindrical sections; interengageable connecting means on said sections; tubular piping for said vessel severed into sections at the junctures of said cylindrical sections; means securing each piping section to its associated cylindrical section; and dowel means for interconnecting the adjacent ends of the piping sections.

References Cited in the file of this patent

UNITED STATES PATENTS

| | | |
|---|---|---|
| 604,708 | Burton | May 24, 1898 |
| 1,265,897 | Fawcett | May 14, 1918 |
| 1,873,748 | Favreau | Aug. 23, 1932 |
| 2,081,329 | Gordon | May 25, 1937 |
| 2,319,882 | Reagan et al. | May 25, 1943 |
| 2,523,508 | Ledgett | Sept. 26, 1950 |
| 2,676,420 | Berg | Apr. 27, 1954 |
| 2,738,584 | Parker | Mar. 20, 1956 |
| 2,760,275 | Stein | Aug. 28, 1956 |

FOREIGN PATENTS

| | | |
|---|---|---|
| 902,636 | France | Dec. 22, 1944 |
| 255,132 | Switzerland | Jan. 3, 1949 |